United States Patent [19]

Hass et al.

[11] Patent Number: 4,850,242
[45] Date of Patent: Jul. 25, 1989

[54] SOFT-RELEASE CABLE OPERATING MEANS

[75] Inventors: Tave Hass, Columbia; Stephen W. Ancell, Huntsville; Curtis H. Porter, Moberly, all of Mo.

[73] Assignee: Orscheln Co., Moberly, Mo.

[21] Appl. No.: 221,204

[22] Filed: Jul. 19, 1988

[51] Int. Cl.⁴ .......................... G05G 1/14; G05G 5/06
[52] U.S. Cl. ........................................ 74/512; 74/531; 74/575
[58] Field of Search ................. 74/512, 575, 576, 578, 74/531, 539; 188/2 D; 192/86

[56] References Cited

U.S. PATENT DOCUMENTS

| | | |
|---|---|---|
| 698,212 | 4/1902 | Miller . |
| 2,464,096 | 3/1949 | Orscheln ..................... 74/518 |
| 2,465,804 | 3/1949 | Henricksen et al. ............ 74/512 |
| 2,520,759 | 8/1950 | Duma ........................ 74/539 |
| 2,905,024 | 9/1959 | McCarthy et al. ............. 74/539 |
| 2,928,292 | 3/1960 | Hirst, Jr. ................... 74/503 |
| 2,940,334 | 6/1960 | Koskela ..................... 74/539 |
| 3,003,365 | 10/1961 | McKenzie ................... 74/542 |
| 3,125,889 | 3/1964 | Perryman ................... 74/111 |
| 3,136,177 | 6/1964 | Roberts et al. ............... 74/531 |
| 3,149,500 | 9/1964 | Swats et al. ................. 74/531 |
| 3,166,951 | 1/1965 | Castellana et al. ............. 74/531 |
| 3,236,120 | 2/1966 | Fender ...................... 74/531 |
| 3,236,121 | 2/1966 | Gdowik et al. ............... 74/531 |
| 3,249,180 | 5/1966 | Torossian ................... 188/67 |
| 3,273,418 | 9/1966 | Ellis ........................ 74/539 |
| 3,315,538 | 4/1967 | Fender ...................... 74/531 |
| 3,361,235 | 1/1968 | Sacchini .................... 192/8 C |
| 3,367,208 | 2/1968 | Fender ...................... 74/531 |
| 3,439,557 | 4/1969 | Bookout .................... 74/531 |
| 3,443,450 | 5/1969 | Fender ...................... 74/481 |
| 3,511,107 | 5/1970 | Yasiro ...................... 74/512 |
| 3,528,533 | 9/1970 | Sacchini .................... 192/41 |
| 3,542,160 | 11/1970 | Sacchini .................... 188/82.6 |
| 3,727,732 | 4/1973 | Barr ........................ 192/26 |
| 3,769,852 | 11/1973 | Peifer et al. . |
| 3,837,450 | 9/1974 | Malion et al. ............... 192/12 AB |
| 4,036,078 | 7/1977 | Muehling ................... 74/539 |
| 4,109,529 | 8/1978 | Niklaus .................... 74/388 R |
| 4,218,936 | 8/1980 | Waggoner .................. 74/512 |
| 4,278,032 | 7/1981 | Kritske ..................... 108/6 |
| 4,379,500 | 4/1983 | Kamino .................... 74/512 X |
| 4,441,380 | 4/1984 | Kawaguchi et al. ........... 74/512 |
| 4,519,270 | 5/1985 | Kawaguchi et al. ........... 74/535 |
| 4,527,683 | 7/1985 | Mathews ................... 192/111 A |
| 4,597,307 | 7/1986 | Kawagushi et al. ........... 74/512 |
| 4,612,823 | 9/1976 | De Leeuw .................. 74/539 |
| 4,624,152 | 11/1986 | Stotz ....................... 74/512 X |

OTHER PUBLICATIONS

Wickes Manufacturing Company, "Mechanical Components".

Primary Examiner—Gary L. Smith
Assistant Examiner—Flemming Suether
Attorney, Agent, or Firm—Laubscher, Presta & Laubscher

[57] ABSTRACT

A soft-release lever-operated control system for parking brake cables is disclosed including a helical main clutch spring arrangement permitting movement of the operating lever only toward the brake-engaged position, and a release device for releasing the main clutch spring to permit return of the operating lever toward the brake-released position. According to another embodiment of the invention, a second helical clutch spring arrangement is provided that is activated when the operating cable is returned to the brake-released position, thereby to activate a cable tension adjusting device that removes slack contained in the inner brake cable operating member. According to a further embodiment, a push-to-release arrangement including a toggle pawl and spring device is operable upon tapping of the operating lever to place the system in a brake-released condition.

9 Claims, 10 Drawing Sheets

SOFT-RELEASE CABLE OPERATING MEANS

STATEMENT OF THE INVENTION

This invention relates to a lever-operated control mechanism for operating a brake cable between brake-released and brake-engaged conditions, including helical spring clutch means for controlling the operation of the operating lever.

BRIEF DESCRIPTION OF THE PRIOR ART

It is well-known in the patented prior art to provide helical clutch spring means for connecting a rotatable shaft with another member, as evidenced, for example, by the patents to Roberts et al U.S. Pat. No. 3,136,177, Swats et al U.S. Pat. No. 3,149,500, Castellana et al U.S. Pat. No. 3,166,951, Fender U.S. Pat. Nos. 3,236,120, 3,315,538, 3,367,208 and 3,443,450, Gdowik et al U.S. Pat. No. 3,236,121, Torossian U.S. Pat. No. 3,249,180, Bookout U.S. Pat. No. 3,439,557 and Niklaus U.S. Pat. No. 4,109,529.

As evidenced by the aforementioned Gdowik et al U.S. Pat. No. 3,236,121, among others, it is known in the parking brake control arrangements to provide clutch spring means for holding the brake cable in a tensioned set or brake-engaged condition, release means (such as manually operable release rod or a fluid pressure-operated motor) being provided for expanding the spring clutch to release the brake. The brake operating lever is connected with the drum upon which the clutch spring is wound by force multiplying means including a toothed plate and a pinion construction, whereby substantial rotation of the pinion occurs, as compared to the angular distance through which the plate is moved by the lever in setting the brakes. Thus, the locking force required of the coil clutch spring means for holding the drum in a brake setting position is greatly reduced.

This clutch spring type of control device affords the advantage over the prior pawl and ratchet type of parking brake control means that owing to the drag applied to the drum during release of the brake, undesirable "slam off" (i.e., large noise and vibration when the control level strikes the abutment on the housing) is greatly reduced.

The present invention was developed to provide an improved parking brake control arrangement wherein the operating lever is directly connected with the drum or torque tube upon which the clutch spring is mounted, whereby the provision of the costly toothed plate and pinion force multiplying means of the prior systems is eliminated, thereby reducing the number of components, complexity and manufacturing cost of the apparatus.

SUMMARY OF THE INVENTION

Accordingly, a primary object of the invention is to provide a parking brake control system of the clutch spring type wherein the operating lever is directly connected with the rotatable torque tube upon which the clutch spring is concentrically mounted.

According to a further object of the invention, the clutch spring parking brake device includes means for automatically reducing slack in the parking brake cable when the operating lever is released from a brake setting condition.

According to another object of the invention, a clutch spring type of parking brake means is provided including push-to-release means in place of the conventional manually- or fluid-pressure-operated release rod means. A toggle arrangement is operable by the operating lever to maintain the clutch spring in an expanded disengaged condition.

Another object of the invention is to provide a control mechanism which is more cost effective because it uses fewer components when compared to the traditional pawl-ratchet type mechanism or the indirect gear-driven force-multiplying clutch spring mechanism. In addition, construction is less costly because the clutch springs are the only heat treated components.

A further object of this invention is to provide a control mechanism with components that may be used in a variety of applications having various angles of operation and load carrying positions. With the present invention, like components may be used unless needed to conform to the individual vehicles or if the load requirements are significantly different.

Still another object of the invention is to improve the life of the mechanism through reduced wear. In the traditional pawl-ratchet type mechanism the contact and dynamic loads are high, which produces high wear on the pawl and ratchet teeth. With a clutch spring, the loads are much more evenly distributed with no dynamic effects which produce wear.

BRIEF DESCRIPTION OF THE DRAWINGS

Other objects and advantages of the invention will become apparent from a study of the following specification when viewed in the light of the accompanying drawings, in which.

DETAILED DESCRIPTION

Referring first more particularly to FIGS. 1-4, the parking brake control apparatus includes a housing 2 having a cover member 4, which housing is adapted to be bolted to the dashboard or fire wall of a vehicle. Rotatably mounted on opposed cylindrical flange portions 2a and 4a of the housing and cover members is a main torque tube 6. Mounted concentrically on, and rigidly secured to, the main torque tube 6 is a foot-operated lever 8 having at its free end a conventional foot pad 10. Connected with the housing 2 by a snap-fit end connector 12 is the outer cable sleeve 14 within which is longitudinally slidable mounted the inner cable member 16 that operates the vehicle parking brake. At its free end, the inner cable member 16 includes an enlarged end portion 16a connected via clevis means 18 to an extension arm portion 8a of the operating lever 8. When the operating lever is in the brake-disengaged position of FIG. 1, the tension in the inner brake operating cable 16 is sufficient to pivot the lever 8 in the clockwise direction into engagement with the stationary resilient bumper or stop 20 that is mounted on the housing 2.

Figure 1:
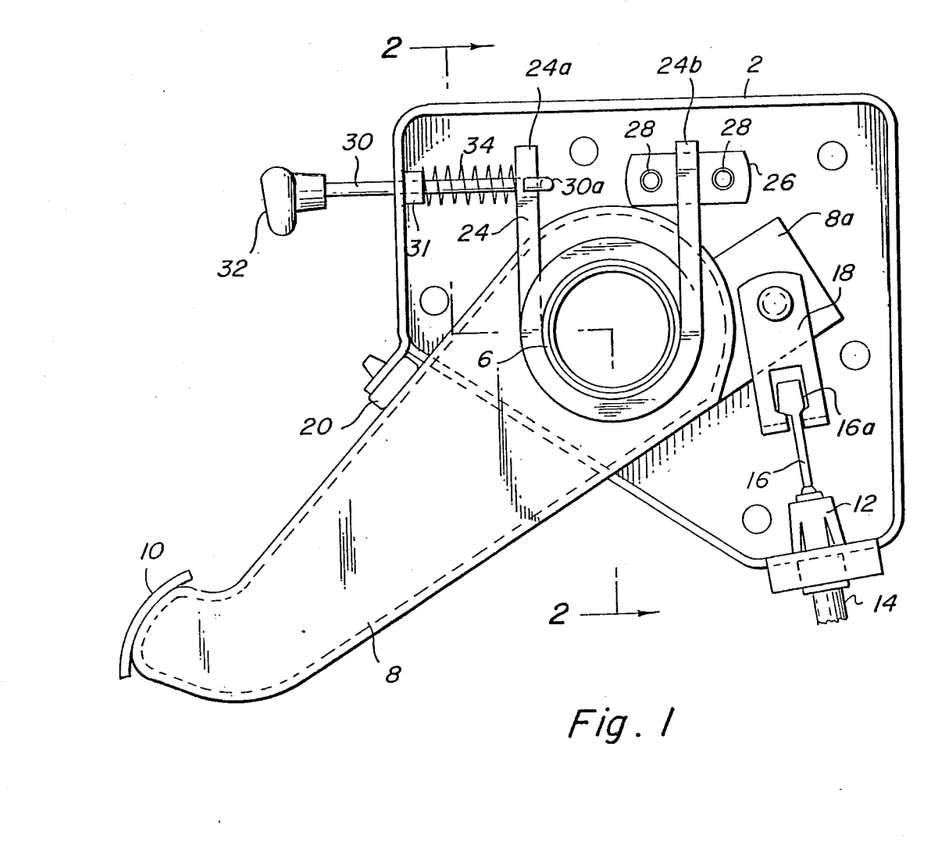
FIG. 1 is a side elevational view, with certain parts removed, of a first embodiment of the brake control apparatus of the present invention when in the brake-disengaged condition.
Figure 2:
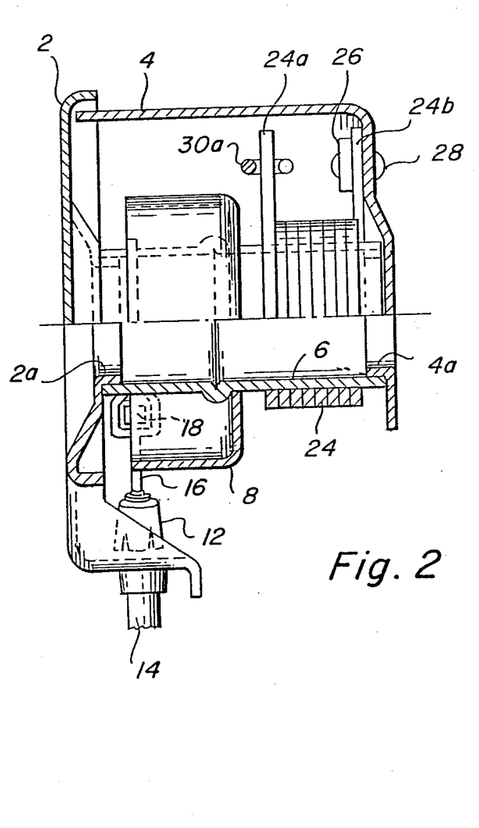
FIG. 2 is a sectional view taken along line 2—2 of FIG. 1.
Figure 3:
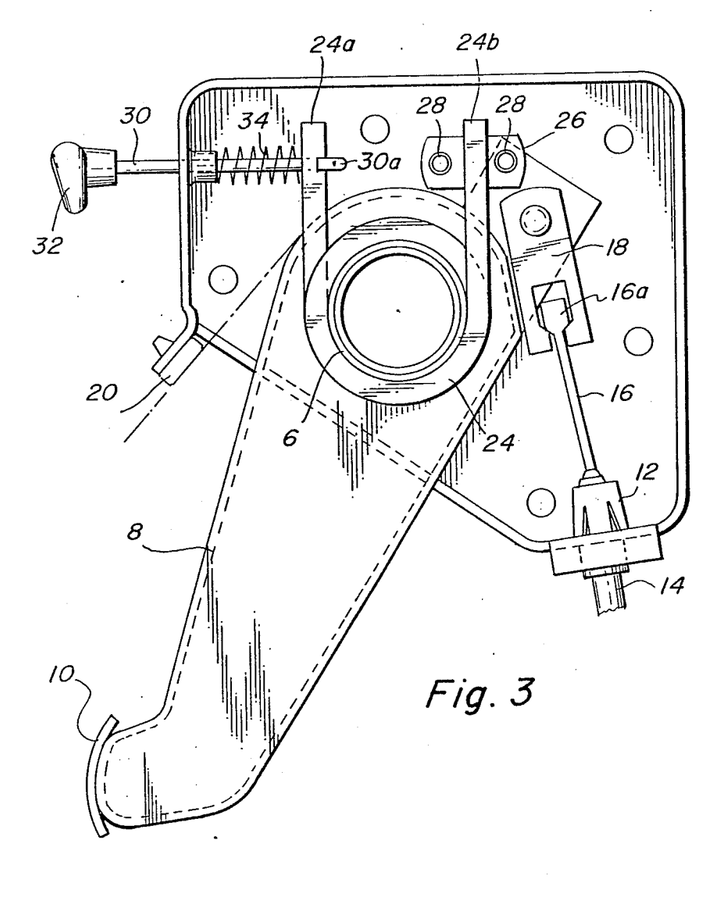
FIG. 3 is an elevational view of the brake control apparatus of FIG. 1 with the operating lever in the brake-engaged position.

In accordance with a characterizing feature of the invention, helical spring clutch means are provided that permit counterclockwise pivotal movement of the operating lever 8 from the brake-disengaged position of FIG. 1 toward the brake-disengaged position of FIG. 3, but which lock the operating lever against pivotal movement in the clockwise direction from the brake-engaged position toward the brake-disengaged position. To this end, a helical spring 24 is mounted concentrically upon the torque tube 6, which helical spring is provided at its ends with linear end portions 24a-24b. The helical spring is normally in the illustrated contracted condition in which it is radially biased inwardly into frictional engagement with the outer circumferential surface of the torque tube 6. The linear end portion 24b of spring 24 is rigidly clamped to the housing by clamping plate 26 and rivets 28, and a release rod 30 is slidably mounted in guide opening 31 contained in the housing, which release rod is provided at one end with a hook portion 30a operatively associated with the other linear end portion 24a of spring 24, and at its other end with an operating knob 32. Release spring 34 mounted concentrically on release rod 30 between the release rod hook portion 30a and guide opening 31 normally biases the release rod to the right in FIG. 1, whereby the helical spring is in its normal contracted condition. The direction of the turns of the helical spring 24 is such that as lever 8 is pivoted in the counterclockwise direction from the brake-released position of FIG. 1 toward the brake-engaged position of FIG. 3, the helical spring tends to unwind slightly from the torque tube and thereby permit this counterclockwise pivotal movement of the lever 8. When the lever is in the FIG. 3 brake-engaged position, however, movement of the lever in the clockwise return direction toward the brake-disengaged position of FIG. 1 is prevented, owing to the winding effect on the spring, and the frictional engagement of the spring with the circumferential surface of the torque tube, thereby locking the lever against pivotal movement in the clockwise direction.

OPERATION (FIGS. 1-4)

Figure 4:
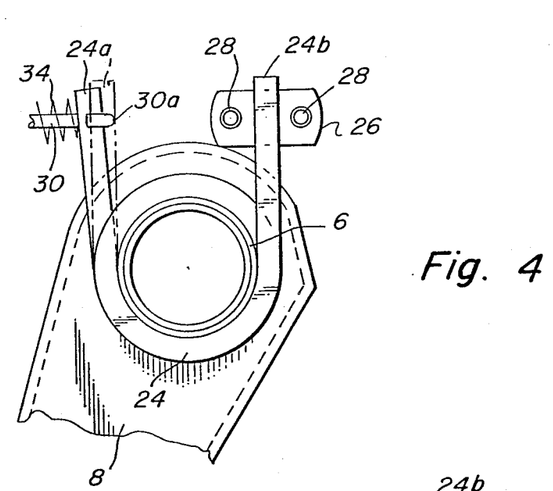
FIG. 4 is a detailed elevational view illustrating the operation of the helical spring clutch to its radially expanded disengaged condition relative to the main torque tube.

Assume that the operating lever has been pivoted from the brake-released position of FIG. 1 to the locked brake-engaged position of FIG. 4. Upon displacement of release rod 30 to the left by manual application of force to the release knob 32, the free end 24a of spring 24 is displaced to the left by the bent end portion 30a of the release rod, whereupon the helical spring 24 is expanded slightly radially outwardly to a released condition relative to the torque tube 6. Owing to the tension on the inner brake cable member 16, lever 8 is then pivoted in the clockwise direction toward engagement with the resilient stop 20. Upon release of the application of force to the release rod 30, spring 34 causes rod 30 to be shifted to the right, whereupon the helical spring 24 returns to its normal contracted condition in frictional engagement with the torque tube 6.

Figure 5:
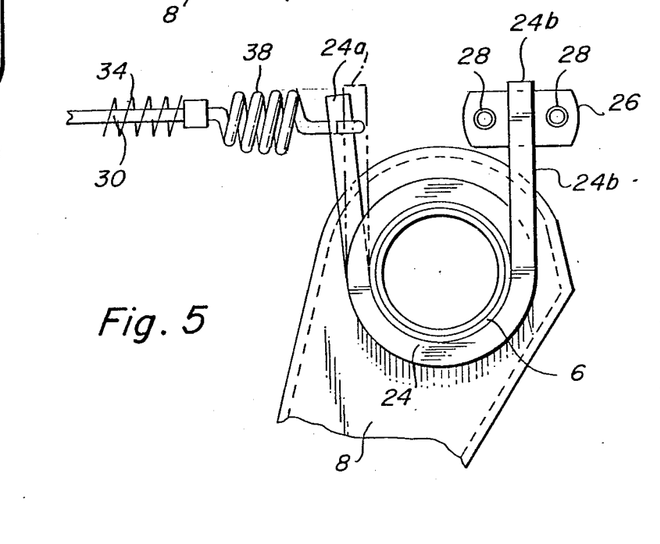
FIG. 5 illustrates a modification to the apparatus of FIGS. 1–4.

Referring now to the modification of FIG. 5, in order to control the amount of expansion of the spring, and thus the extent of the frictional drag force applied to the main torque tube 6, a buffer spring 38 is connected between the release rod 30 and the linear end portion 24a of the main helical spring 24. Thus, the buffer spring 38 limits the amount of unwinding of the clutch spring 24, which further controls the drag on the torque tube 6 and the resulting "slam off".

Figure 6:
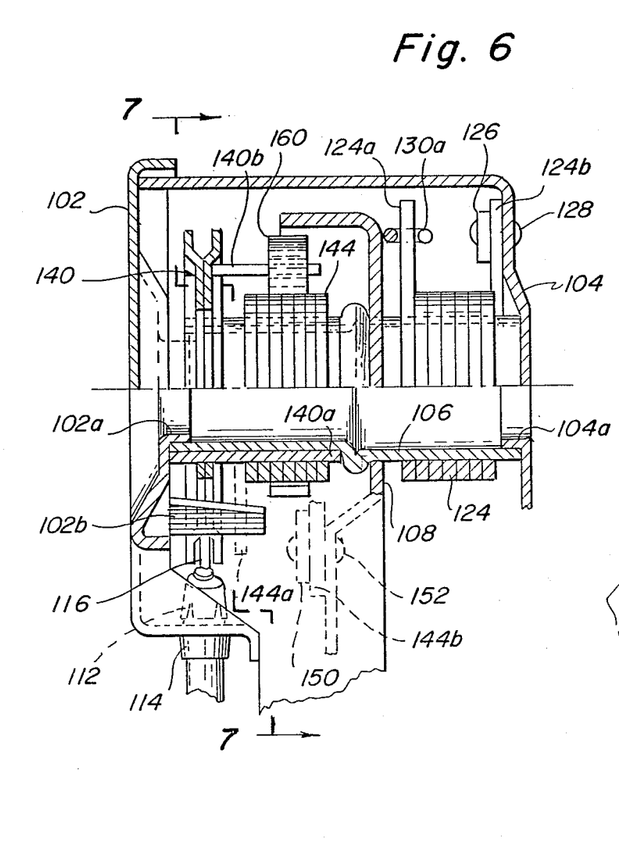
FIG. 6 is a longitudinal partly sectioned view of a second embodiment of the brake control apparatus including cable slack adjusting means.
Figure 7:
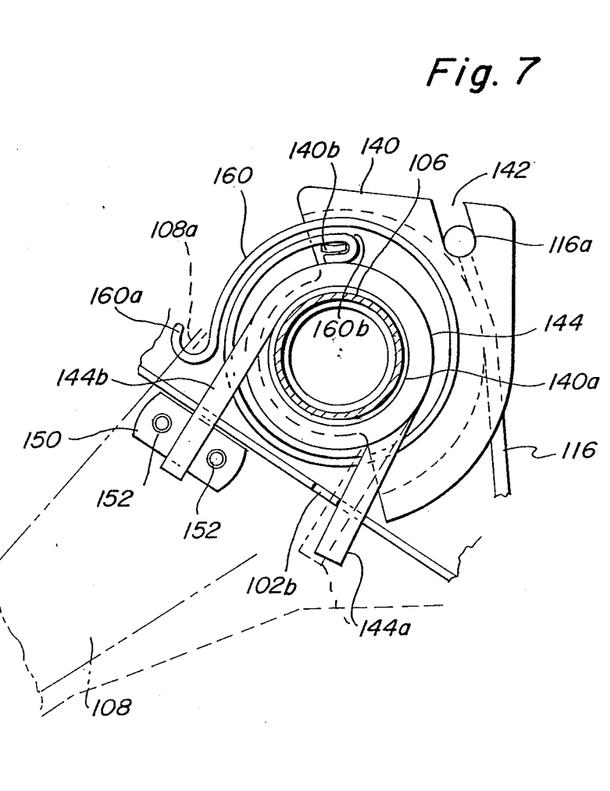
FIG. 7 is a sectional view taken along line 7—7 of FIG. 6.

Referring now to the embodiment of FIGS. 6 and 7, in accordance with an important feature of the present invention, cable tension control means are provided for automatically reducing or eliminating slack in the inner brake cable operating member 116. In this embodiment, the main torque tube 106 is rotatably mounted upon annular support flanges 102a and 104a formed in the housing and cover members, respectively, the main helical clutch spring 124 being mounted circumferentially upon the torque tube 106. One end 124b of the helical spring 124 is secured to housing cover 104 by clamp plate 126 and rivets 128. The clutch spring 124 is normally in a contracted condition in frictional engagement with the outer peripheral surface of the torque tube, the direction of turns of the coil spring being such that pivotal movement of the operating lever 108, which is rigidly fastened to the torque tube 106, is permitted only in the counterclockwise direction toward the brake-engaged position. Movement of the operating lever in the clockwise direction is prevented since this tends to wind the helical spring to lock the same in tight frictional engagement with the torque tube, and thus prevent pivotal movement of the torque tube in the clockwise direction. Journalled on the other end of the torque tube 106 is the tubular hub portion 140a of the cable pulley 140 to which the enlarged free end 116a of the inner cable member 116 is connected by slot means 142, as shown in FIG. 7. Mounted concentrically about the cable pulley hub portion 140a is a second helical clutch spring 144. This second clutch spring 144 normally is in a radially contracted condition in frictional engagement with the outer circumferential surface of the cable pulley hub portion 140a. The second helical clutch spring 144 includes a pair of linear tangentially-extending end portions 144a and 144b, the linear end portion 144b being clamped to the operating lever 108 by clamp plate 150 and rivets 152. The other linear end portion 144a of the second helical clutch spring 144 is arranged for abutting engagement with a stationary projecting tab portion 102b of the housing 102 when lever 108 is in the brake-released position, thereby to operate spring 144 to its expanded condition.

Arranged concentrically in spaced relation about the second helical clutch spring 144 is a spiral spring member 160 having bent end portions 160a and 160b that engage corresponding lateral tab portions 108a and 140b on the operating lever 108 and the cable pulley 140, respectively, as shown in FIG. 7.

OPERATION (FIGS. 6 AND 7)

In operation, assume that the operating lever 108 is in its initial brake-released position. Upon application of force to lever 108 in the counterclockwise direction toward the brake-engaged position, lever 108 and torque tube 106 rotate relative to the main spring clutch means 124, owing to the direction of the turns of the helical spring 124. Owing to the direction of the turns of the second helical spring 144, this spring will be biased in tight frictional engagement with the hub portion 140a of the cable pulley 140, whereupon the cable pulley is rotated by the operating lever 108 to longitudinally displace the inner brake cable member 106 relative to the outer sleeve member 114, thereby to effect engagement of the brake means associated with inner cable 116 (for example, the parking brake of the vehicle). When the brake operating lever 108 is in the brake-engaged position, the main helical spring 124 prevents rotation of the main torque tube 106 and the operating lever 108 in the clockwise direction, so that the parking brake means will remain in the engaged position.

To release the parking brake means, release rod 130 is displaced to cause the bent portion 130a to engage the free end 124a of the main helical spring 124, thereby to operate the spring to an expanded condition out of frictional engagement with the main torque tube 106. Owing to the tension of the inner cable member 116, cable pulley 140 and lever 108 are pivoted in the clockwise direction toward the brake-released position. As lever 108 approaches the brake-released position, the free end portion 144a of the second helical main spring 144 engages the lateral tab portion 102b of the housing 102, thereby operating spring end 144 to effect expansion of spring 144 and release of the frictional engagement between the spring and the hub portion 140a of the cable pulley 140. At this time, the spiral cable tension adjusting spring 160 becomes operable to rotate the cable pulley 140 relative to the operating lever 108, thereby to remove any slack that might exist in the inner cable member 116. Thus, tab 102b causes control cable 116 and cable pulley 140 to float in equilibrium until braking force is again applied to lever 108. Upon the next application of a braking force to lever 108, the free spring end portion 144a of spring 144 is displaced away from the stationary housing tab 102b, thereby to effect re-engagement between the second helical spring 144 and the hub portion 140a of the cable pulley 140.

According to a modification of this embodiment, the tab 102b can be eliminated if the force of the spiral spring 160 is sufficiently increased to match the overrunning torque application of the clutch spring 144. This tab 102b prevents possible over adjustment of slack removal.

Figures 8, 10:
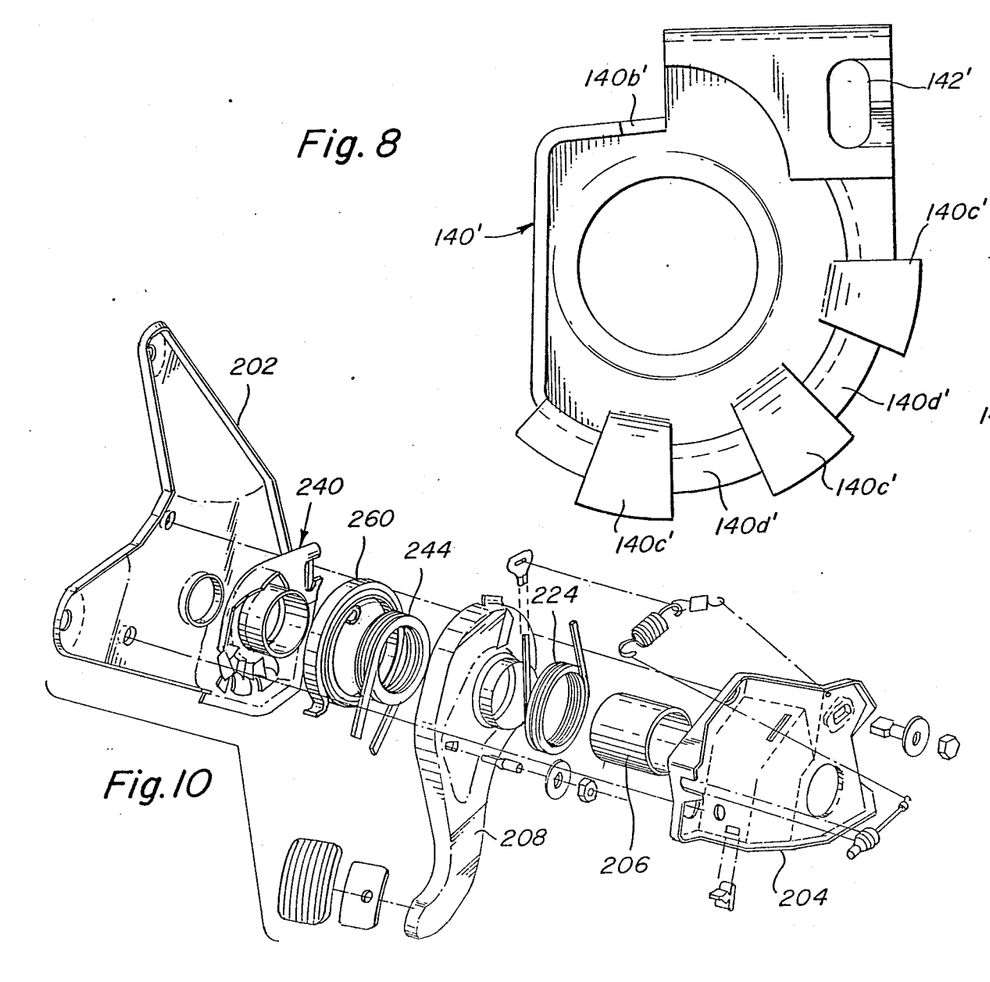
FIGS. 8 and 9 are front and side elevational views, respectively, of a modification of the cable pulley of FIG. 6.
FIG. 10 is an exploded view of the brake control apparatus including cable slack tensioning means, use being made of a cable pulley similar to that of FIGS. 8 and 9.
Figure 9:
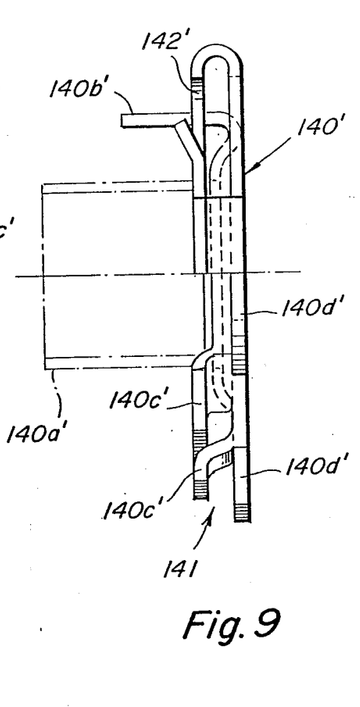

Referring now to the modification of FIGS. 8 and 9, the cable pulley 140' is of integral construction and includes a plurality of integral tab portions 140c' and 140d' that are successively bent in opposite axial directions to define a channel 141 (FIG. 9) for receiving the inner cable member 116. The cable pulley 140' contains a slot 142' for receiving the enlarged end portion 116a of the inner cable member.

FIG. 10 illustrates in an exploded perspective view of a brake cable operating apparatus including a cable pulley having a structure similar to that of FIGS. 8 and 9.

Figure 11:
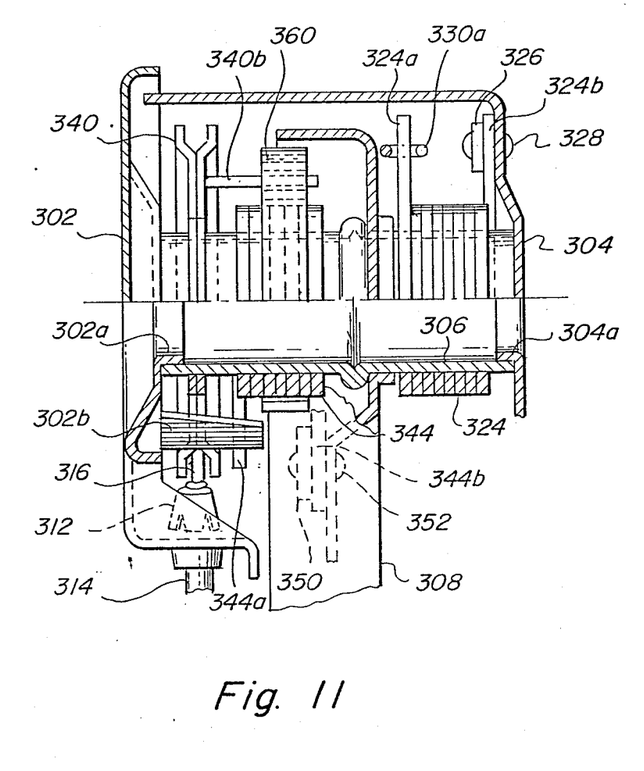
FIGS. 11 and 12 are longitudinal sectional views of two further embodiments corresponding generally with the apparatus of FIG. 6, which embodiments are each provided with cable slack adjusting means.

Referring now to the embodiment of FIG. 11, the torque tube 306 is mounted for rotation between the journal supports 302a and 304a of the housing and cover members, respectively, the cable pulley 340 is secured to the main torque tube 306, and the operating lever 308 is rotatably mounted upon the main torque tube 306. In this embodiment, the second helical spring 344 is mounted directly in concentric relation upon the main torque tube, 306, one end 344b of this second spring being clamped to the operating lever 308 by clamp plate 350 and rivets 352. The other end 344a of the second helical spring 344 is arranged to engage the stationary housing tab 302b when the operating lever 308 is pivoted to its brake-released position relative to housing 302.

OPERATION (FIG. 11)

During the operation of the embodiment of FIG. 11, as operating lever 308 is pivoted toward the brake-engaged position, the second helical spring 344 is wound into tight frictional engagement with the main torque tube 306, thereby causing cable pulley 340 to displace the inner cable member 316 in the brake-engaged direction relative to the outer sleeve member 314. The operating lever 308 is maintained in the brake-engaged position owing to the frictional engagement between the main helical spring 124 and the outer circumferential surface of the main torque tube 306. At this point, the operating lever 308 could be returned to its original position, thereby tending to unwind the second helical spring 344, allowing it to release the main torque tube and the cable pulley 340 and return it to its original position. This action is referred to as a "full back" mechanism and is used when the applied lever position is inconvenient. Upon release of the main spring clutch means 324 by the release rod 320, operating lever 308 is pivoted in the clockwise direction toward its brake-released position, owing to the tension of the inner cable member 316. When the operating lever 308 reaches its brake-released position relative to the housing, the free end 344a of the second helical spring 344 engages the stationary housing tab 302b, thereby causing expansion of the second helical spring 344 to release the main torque tube and the cable pulley 340 from the operating lever 308, whereupon the cable tension spring 360 expands to rotate cable pulley 340 and main torque tube 306 in a direction to remove the slack from inner cable member 316.

As in the prior embodiment, the stationary housing tab 302b could be eliminated by increasing the biasing force of the spiral spring 360 to match the overrunning torque application of clutch spring 344.

Figure 12:
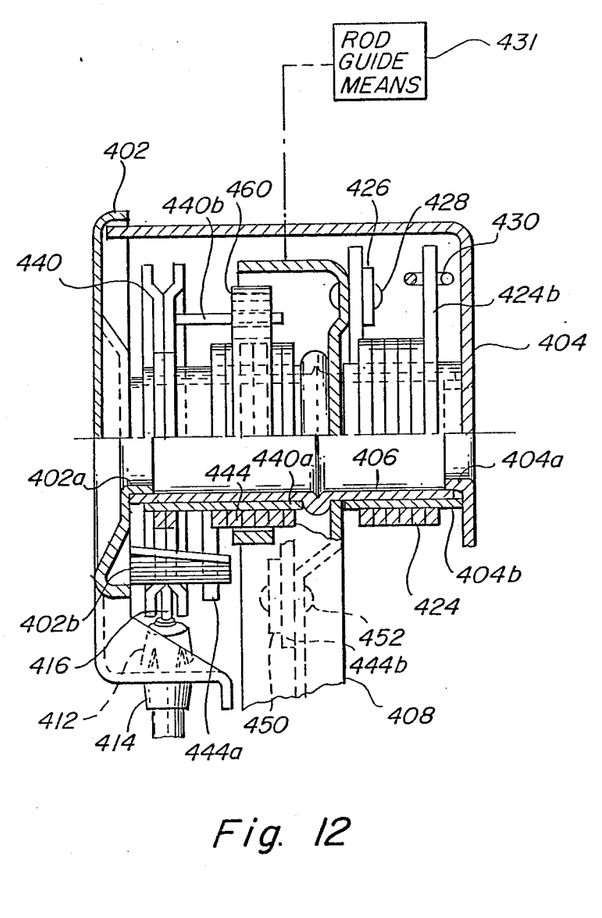

Referring now to the embodiment of FIG. 12, the housing cover 404 is provided with a stationary tubular portion 404b arranged concentrically about the main torque tube 406. The main helical spring 424 is mounted concentrically about, and is biased radially into frictional engagement with, the cover tubular portion 404b. One free end 424a of the main spring 424 is clamped to the operating lever 408 by clamping plate 426a and rivets 428, and the other end 424b of the main spring is arranged for operation by a release rod 430 that is slidably connected by rod guide means 431 carried by the operating lever 408. In this embodiment, as the operating lever 408 is pivoted in the direction of the brake engaged position, the main spring 424, the rod guide means 431, and the release rod 430 are pivoted about the stationary tubular portion 404b of the housing cover 404. Since the free end 444b of the second coil spring is also connected with the operating lever 408 by the plate 450 and rivets 452, the second operating spring 444, together with the hub portion 440a and the cable pulley 440 are also rotated by the operating lever 408, thereby to operate the inner cable member 416 to the brake-engaged position relative to the outer cable sleeve member 414. To return the operating lever to its initial brake-released position, release rod 420 is actuated to displace the end portion 424b of the helical main spring 424 to expand this spring radially outwardly, and thereby release it from the stationary tubular cover portion 404b. Owing to the tension of the inner cable member 416, cable pulley 440, hub portion 440a, the second helical spring 444 and the operating lever 408 are now pivoted to the initial brake-released position. Since the release mechanism rotates with the operating lever, this embodiment is ideal for a hand-operated brake arrangement having a release button on the end of the operating lever 408. As the operating lever approaches this brake-released position, the free end 444a of the second helical spring 444 engages the stationary housing tab 402b, whereupon the second helical spring is expanded and released from the hub portion 440a of the cable pulley 440. The spiral slack adjusting spring 460 then is operable to rotate the cable pulley 440 in a direction relative to the operating lever 408 such that any slack in the inner cable member 416 is removed. As in the prior embodiments, the release tab 402b could be eliminated by appropriate relative biasing strengths of the spiral and helical springs.

Figures 13, 14:
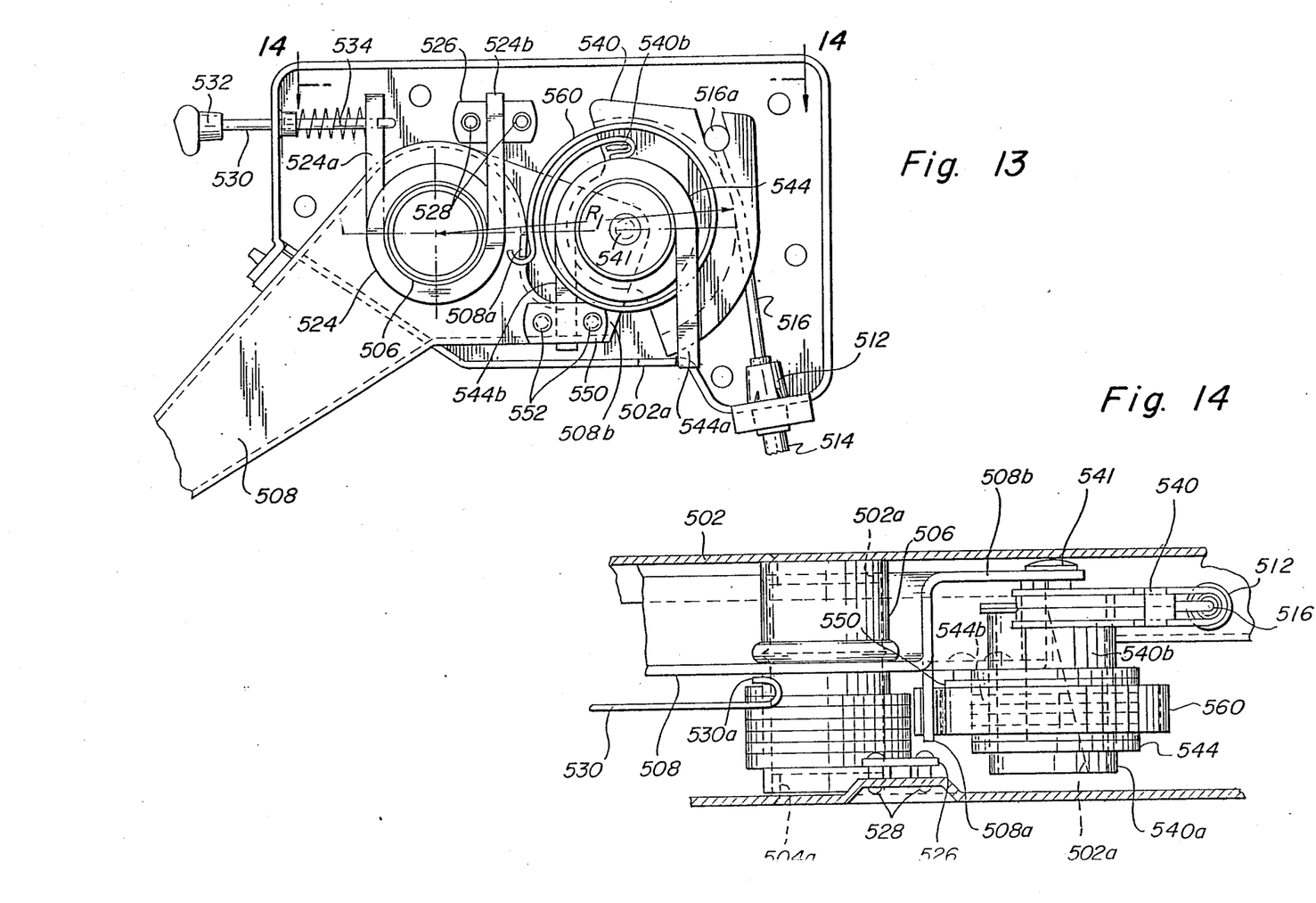
FIG. 13 is an elevational view of another embodiment of the invention wherein the control apparatus includes both cable slack adjusting means, and means for applying a varying mechanical advantage to the inner brake operating cable.
FIG. 14 is a detailed sectional view taken along line 14—14 of FIG. 13.

According to another important feature of the invention, in addition to the provision of the slack-adjusting means for removing slack in the inner cable member, means are also provided for applying a varying mechanical advantage to the inner cable member during pivotal movement of the operating lever toward the brake-engaged position. Referring to FIGS. 13 and 14, it will be seen that the operating lever 508 includes an arm portion 508b that extends from the opposite side of the main torque tube 506 from the operating lever 508. Rotatably mounted upon a pivot axis 541 carried by the lever arm extension 508b is the cable pulley 540 having an integral hub portion 540a. The second helical spring 544a is mounted concentrically upon the cable pulley hub portion 540a, and is normally biased radially inwardly into frictional engagement therewith. The spiral tension adjusting spring 560 is arranged in concentrically spaced relation about the second helical spring 544, the bent ends of the spiral spring being operable to engage the operating lever tab 508a and the tab 540b that extends laterally from the cable pulley 540. In this embodiment, the increasing mechanical advantage afforded by the decreasing distance $R_1$ between the pivot axis 541 and the pivot axis of the main torque tube, thereby affording a greater effective lever arm for operating the inner cable member 516 as the operating lever is applied.

Figures 15, 16:
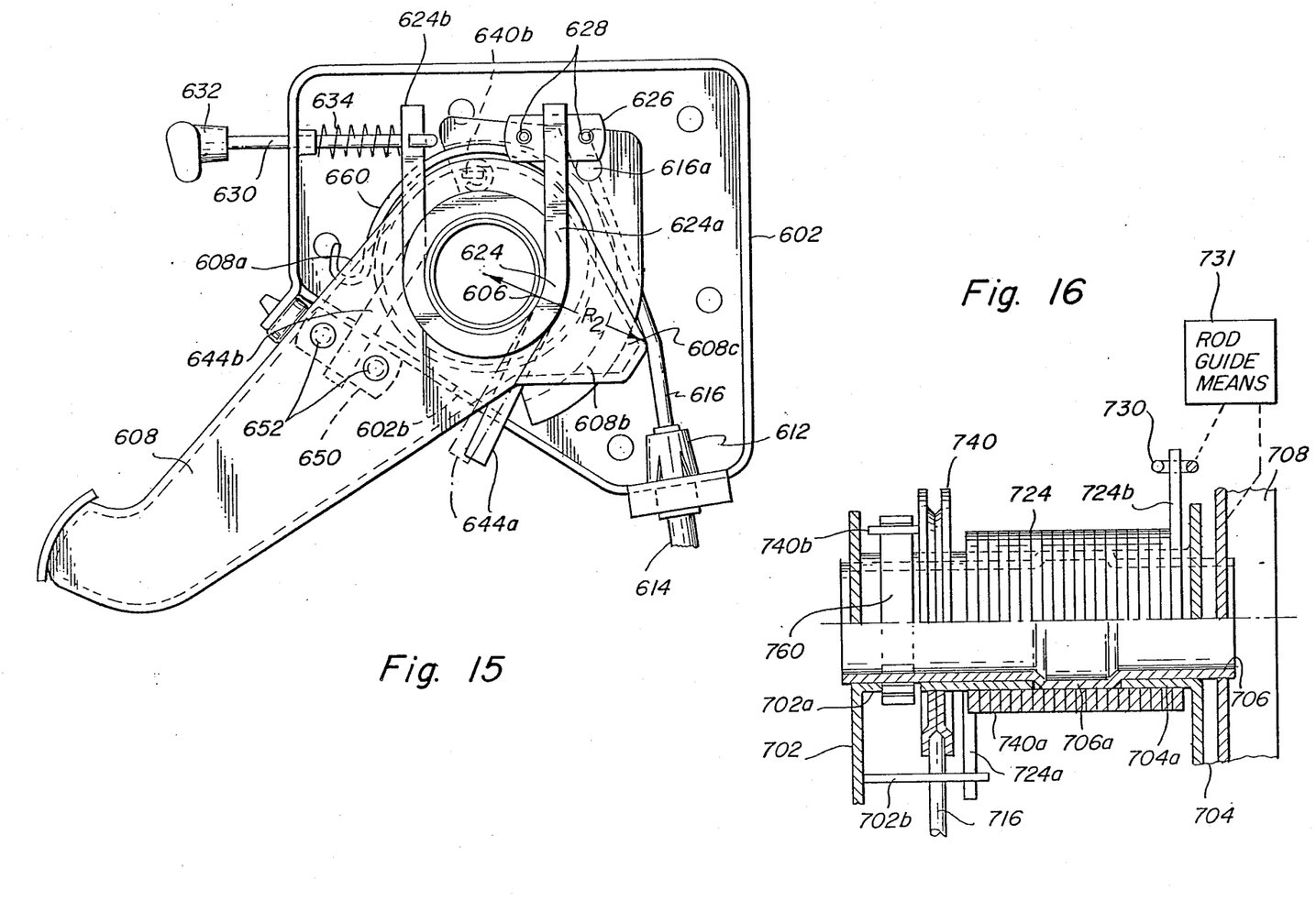
FIG. 15 is an elevational view of another embodiment of the invention including means affording a mechanical advantage.
FIG. 16 is longitudinal sectional view of a modification of the invention including only a single helical spring clutch.

A similar varying mechanical advantage is afforded by the embodiment of FIG. 15, which is generally similar to the embodiment of FIGS. 6 and 7. In the embodiment of FIG. 15, the operating lever 608 is provided with an arm portion 608b that extends from the opposite side of the main torque tube 606, this lever arm portion having a nose extremity 608c that engages the inner cable member 616. As shown in FIG. 15, when the operating lever 608 is pivoted in the counterclockwise direction toward the brake-engaged position, the decreased lever arm $R_2$ affords an increased mechanical advantage for operating the inner cable member 616 relative to the housing 602.

Referring now to the embodiment of FIG. 16, a single main helical clutch spring 724 serves both to connect the operating lever 708 with the stationary cover member 704, and to connect the cable pulley 740 with the main torque tube 706. In this embodiment, the main torque tube 706 is journalled at one end in the flange portion 702a of the housing 702, and extends at its other end through the tubular flange portion 704a of the cover 704. The operating lever 708 is secured, for example by welding, to the free end of the torque tube 706. Rotatably mounted on the torque tube is the cable pulley 740 having a tubular hub portion 740a journalled on the main torque tube 706. Intermediate its ends, the main torque tube includes an enlarged cylindrical portion 706a, having the same outer diameter as the said cable pulley hub portion 740a, and the cover flange portion 704a. Mounted circumferentially about, and in frictional engagement with the circumferential surfaces of, the cable pulley hub portion 740a, the main torque tube enlarged portion 706a, and the cover flange portion 704a is the main helical clutch spring 724. At one end, the helical spring includes an end portion 724a that is adapted to engage a stationary tab 702b on the housing when the lever 706 is in the brake-released position, and at the other end the spring has an end portion 724b that is operable by guide rod 730 which is guided for axial sliding movement by the rod guide means 731 carried by the operating lever 708. In this embodiment, when the operating lever 708 is pivoted in the brake-engaging direction, the torque tube 706 secured thereto, helical main spring 724, rod 730, rod guide means 731, and cable pulley 740 are all pivoted in the brake-engaging direction, thereby operating the inner cable member 716 toward the brake-engaged position relative to the stationary cable sleeve. Upon removal of brake-applying force on the lever 708, clutch spring 724 frictionally engages torque tube 706 to prevent pivotal movement of the lever in the brake-releasing direction. Upon operation of the release rod 730, the adjacent end of the helical spring is operated to an expanded condition, thereby permitting pivotal movement of the operating lever toward the brake-released position. When the operating lever reaches this brake-released position, coil end portion 724a engages the stationary tab 702b on the housing, thereby expanding the adjacent end of the helical spring 724 to release the cable pulley 724, which is then operated by the spiral cable adjusting spring 760 to remove slack from the inner cable member 716. Alternatively, the stationary tab 702b may be positioned so that it will not expand the adjacent end of helical spring 724, depending on the degrees of resiliency of the various springs. The tab serves to prevent rotational shifting of helical spring 724 away from release rod 730, which would render the brake unreleasable.

Figure 17:
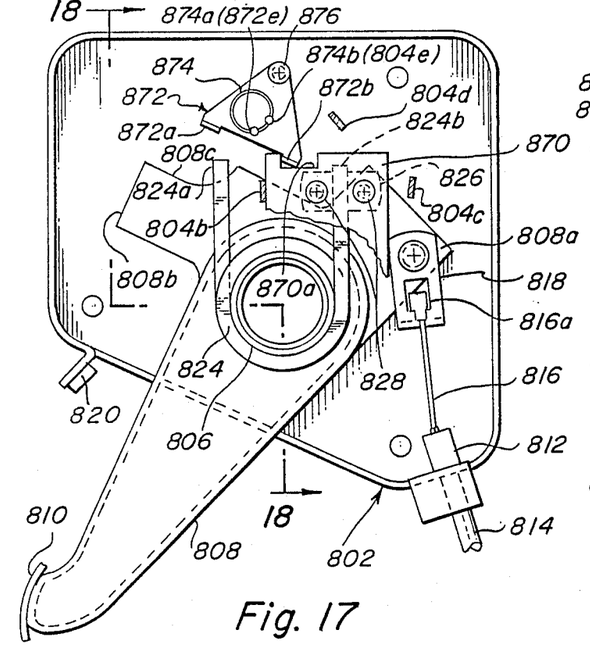
FIG. 17 is a side elevational view, with certain parts removed, of a further embodiment of the invention including push-to-release means for releasing the brake control apparatus from a brake engaged or set condition, the apparatus being illustrated in the brake-applying condition.
Figure 18:
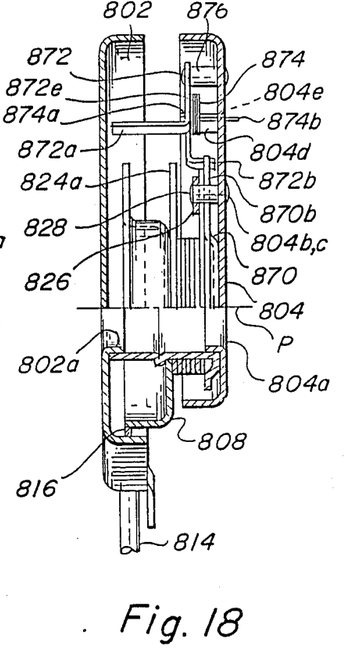
FIG. 18 is a sectional view taken along line 18—18 of FIG. 17.

Referring now to the embodiments of FIGS. 17-20, in order to avoid the use of the previously-described conventional release rod means for expanding the clutch spring to a released condition, push-to-release means are incorporated that are operable by the control lever 808 to release the parking brake control means from its set (i.e., brake-engaged) condition. More particularly, a release bracket 870 mounted concentrically on the annular cover flange 804a (FIG. 18) is pivotally displaceable between first and second positions in engagement with cover tabs 804b (FIG. 17) and 804c (FIG. 19), respectively. Associated with the brake release bracket is a toggle pawl 872 that is connected with the cover member 804 by rivet 876 for pivotal movement between an operable position in engagement with stationary tab 804d (FIG. 20), and an inoperable position (FIG. 17) spaced from the free arm 824a of clutch spring 824. The pawl 872 is provided with tabs 872a and 872b that extend in opposite directions, as shown in FIG. 18. Pawl tab 872b is operable to extend within a corresponding slot 870a contained in the end extremity of release bracket 870 when the bracket and the pawl arm are in the inoperable (FIG. 17) condition, and when the pawl is in the operable condition of FIG. 20, the pawl projection 872 is operable to engage the inner surface of the extremity of clutch spring arm portion 824a to maintain this spring in an expanded disengaged condition, as will be discussed in greater detail below.

As in the previous embodiments, the clutch spring 824 is mounted concentrically upon the torque tube 806 to which is welded one end of the operating lever 808. The other end of this operating lever 808 is provided with a foot pad 810.

Associated with the toggle pawl member 872 is a toggle spring 874, which spring is a helical spring having a pair of axially extending terminal portions 874a and 874b that extend through corresponding openings 872e and 804e contained in the pawl and in the cover member, respectively. These terminal end portions are resiliently biased apart to effect the desired toggle operation of the pawl as will be described below.

One end portion 824b of the clutch spring 824 is clamped to the release bracket 870 by clamping plate 826 and rivets 828. The operating lever 808 has a first extension portion 808a to which the inner cable member 816 is connected by clevis 818, and the operating lever is also provided with a second portion 808b having a cam ramp service 808c adjacent the tab portion 872a on the pawl.

OPERATION (FIGS. 17-20)

In order to set the parking brake means, brake-applying force is applied to pad 810 to pivot operation lever 808 in the counterclockwise direction about its pivot axis P (FIG. 18) whereupon clutch spring 824 and release bracket 870 are similarly pivoted in the counterclockwise direction until the release bracket 780 engages fixed stop 804b on the cover member 804. Owing to the direction of the turns of the clutch spring, pivotal movement of lever 808 in the counterclockwise direction is permitted, thereby applying braking pressure to the inner cable member 816 via lever extension portion 808a, clevis 818, and the cable and end fitting 816a.

Figure 19:
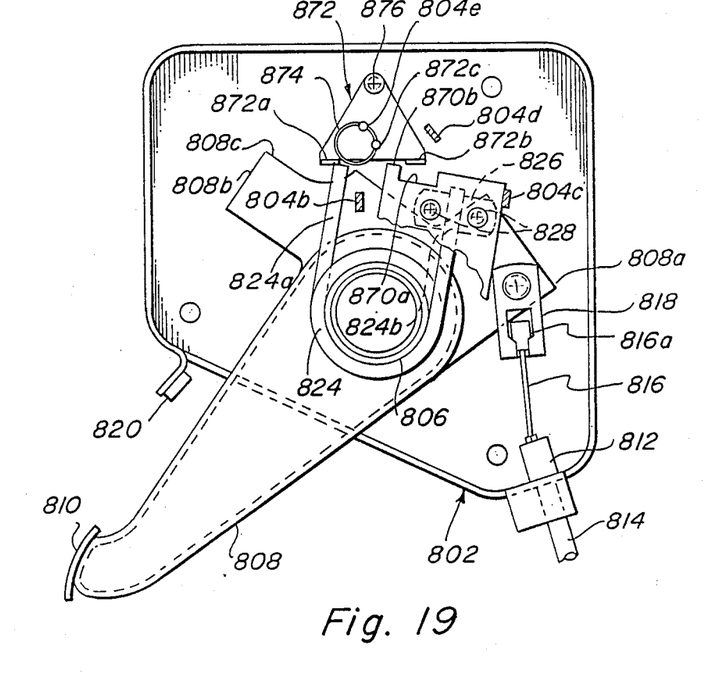
FIGS. 19 and 20 are side elevational views corresponding to FIG. 17 for illustrating the brake engaged or set condition and the brake released conditions, respectively.

After the operator senses that the parking brake has been applied, the operator releases operating lever 808, which lever is then caused to rotate in the clockwise direction owing to the tension in inner cable member 816. However, during this clockwise movement of lever 808, release bracket 870 is similarly pivoted in the clockwise direction until it engages the fixes stop 804c (FIG. 19), whereupon the clutch spring is locked into tight frictional engagement with the torque tube 806. This clockwise movement of the release bracket causes projection portion 870b adjacent the slot 870a to progressively pivot the pawl 872 in the counterclockwise direction about its rivet 876, with the result that the end 874a of the toggle spring 874 is pivoted about the end 874b that extends through opening 804e in the cover member. Owing to the resilient biasing apart of the ends of the toggle spring and the overcenter condition of the toggle spring, the pawl 872 is now tripped in the counterclockwise direction until the pawl tab 872a abuts the end extremity of the free end 824a of the clutch spring 824, as shown in FIG. 19. The inner cable member 816 is now locked in its tensioned condition to set the parking brake in the brake-engaged condition.

Figure 20:
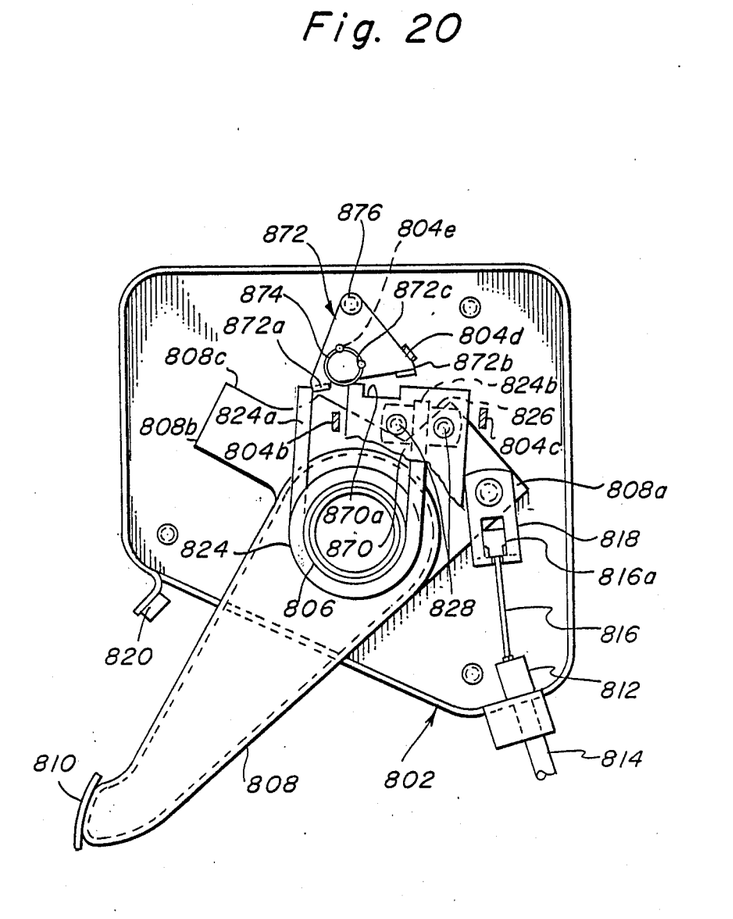

To release the parking brake, the operator again applies pressure to the foot pad 810 to pivot operating lever 808 in the counterclockwise direction, whereupon clutch spring 824 and release bracket 870 are pivoted slightly in the counterclockwise direction until the pawl tab 872a is released from the end extremity of clutch spring end portion 824a as shown in FIG. 20. Owing to the biasing of the toggle pawl by the toggle spring 874, the pawl is pivoted in the counter clockwise direction into engagement with the fixed stop 804d (FIG. 20), and owing to the tension of the inner cable member 816, the operating lever 808 is released for pivotal movement in the clockwise direction toward the brake-released condition shown in FIG. 20. During the final pivotal movement of lever 808 towards its fixed resilient abutment 820 on the housing 802, the cam ramp 808c on the lever extension portion 808b engages the tab portion 872a on pawl 872, thereby to pivot the pawl in the clockwise direction, whereupon the pawl tab 872b again is inserted within the slot 870a contained in the end extremity of release bracket 870. The control apparatus is now in the brake-released condition.

Figure 21:
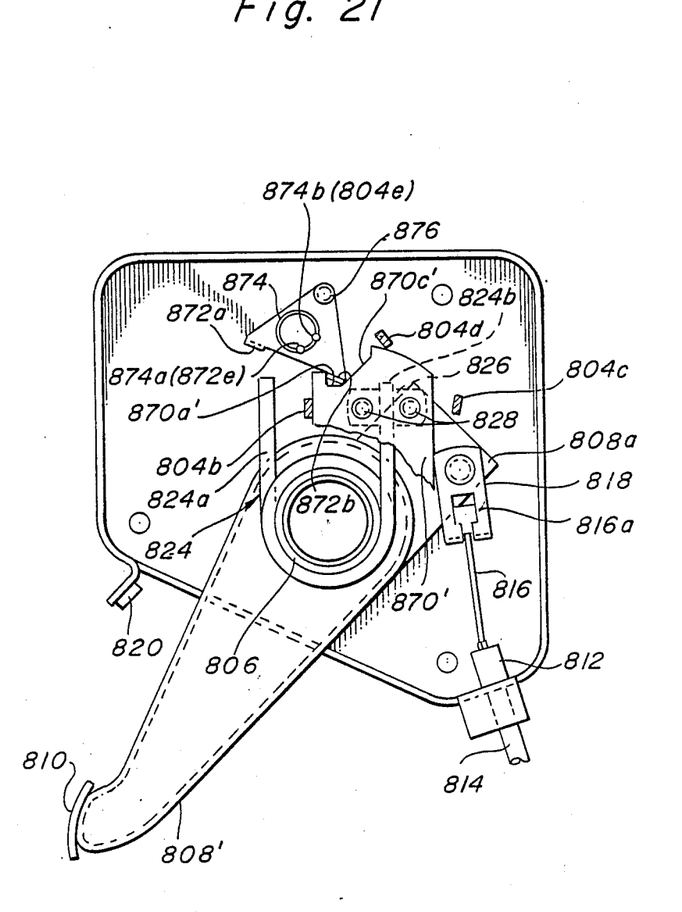
FIG. 21 is a side elevational view of a modification of the apparatus of FIGS. 17–20.

Referring now to the modification of FIG. 21, instead of providing a ramp surface on an extension of the control lever, the slot 870a' contained in the end extremity of release bracket 870' includes an angularly arranged second portion 870c' which engages pawl tab 872b to pivot pawl 872 in the clockwise direction as the release bracket pivots in the counterclockwise direction upon the release of operating force from the lever 808'. Once the pawl is pivoted in the clockwise direction to a point that the spring end 874a goes overcenter relative to the spring end 874b, the stored energy of the toggle spring 874 biases apart the ends of the toggle spring to complete the pivotal movement of the pawl in the clockwise direction.

While, in accordance with the Patent Statutes, the preferred forms and embodiments of the invention, have been illustrated and described, it is apparent that various changes and modifications may be made without deviating from the inventive concepts set forth above.

What is claimed is:

1. Control apparatus for axially displacing an inner cable member relative to a tubular concentrically arranged outer sleeve member, comprising:

(a) a housing adapted for connection with one end of the sleeve member;
   (b) a cylindrical main torque member rotatably connected within said housing;
   (c) operating lever means including an operating lever mounted concentrically on, and extending generally radially outwardly from, said main torque member;
   (d) means operable to connect said operating lever means with one end of the inner cable member;
   (e) means connecting said operating lever means directly with said main torque member for pivotal movement about the longitudinal axis of said main torque member between released and engaged positions relative to said housing, thereby to rotate said main torque member between engaged and released positions relative to said housing;
   (f) main helical spring clutch means for releasably connecting said main torque member with said housing, said main spring clutch means including a helical main spring mounted concentrically about, and normally biased radially inwardly into frictional engagement with, said main torque member, said helical main spring including end portions one of which is connected with said housing, and the other of which is arranged for operation by said release means, said main spring clutch means normally having a contracted condition affording pivotal movement of said torque member only in the direction of said engaged position;
   (g) release means for expanding said main spring to an expanded condition in which said main spring is released from said main torque member, thereby to permit rotational movement of said main torque member toward its released position; and
   (h) slack adjusting means connected between said operating lever and said inner cable member connecting means for automatically removing slack in the inner cable member when said operating lever is in the disengaged position, said slack adjusting means including:
      (1) pulley means mounted concentrically about said main torque member, said pulley means being adapted for connection with the inner cable member, one of said operating lever and pulley means being rigidly connected with said main torque member, and the other of said operating lever and pulley means being rotatable relative to said main torque member;
      (2) locking means operable when said operating lever is displaced toward said engaged position to lock said rotatable other means against rotation relative to said torque member, said locking means being operable when said operating lever is in the disengaged position to release said rotatable other means for rotation relative to said torque member, said locking means including a second helical clutch spring mounted concentrically relative to said rotatable other member, one end of said second spring being connected with said operating lever, and the other end of said second spring being operable by said housing to expand said second helical spring when said operating lever is in the disengaged position; and
      (3) pulley spring means rotatably biasing said rotatable other means relative to said torque tube in a direction to increase the tension of the cable inner member.

2. Apparatus as defined in claim 1, wherein said pulley spring comprises a spiral spring mounted concentrically relative to the longitudinal axis of said main torque member, the ends of said spiral spring being connected with said lever and with said pulley, respectively.

3. Apparatus as defined in claim 1, wherein said rotatable other means is said pulley means, said cable pulley means including a pulley having a tubular central hub portion mounted concentrically on said main torque member, said second helical spring being arranged concentrically about said cable pulley hub portion, the direction of the turns of said second helical spring being such as to effect functional locking engagement of said second spring with said hub portion during pivotal movement of said operating lever toward the engaged position.

4. Apparatus as defined in claim 3, wherein said cable pulley is of integral construction and includes a plurality of circumferentially arranged tab portions successively bent in opposite axial directions, respectively, thereby to define a circumferential groove for receiving the inner member.

5. Apparatus as defined in claim 1, wherein said other rotatable means is said operating lever means, said pulley being secured to said main torque member said second helical spring being arranged concentrically about said main torque member with the direction of turns of said second helical spring being such as to effect frictional locking engagement of said second spring with said main torque member during pivotal movement of said operating lever toward the engaged position.

6. Apparatus as defined in claim 1, wherein said housing includes a tubular portion in which one end of said main torque member is journalled; and further wherein said main helical spring clutch means includes a helical main spring mounted concentrically about, and normally having a radially contracted condition in frictional engagement with, said housing tubular portion, one end of said helical main spring being connected with said lever, said release means being mounted on said operating lever for operating the other end of said main spring to expand the same into an expanded released condition relative to said housing tubular portion, thereby to release the operating lever for pivotal movement toward the released position.

7. Apparatus as defined in claim 3, wherein said operating lever includes an arm portion extending radially outwardly from said main torque member from the opposite side thereof relative to said operating lever, and further including means on said arm portion for increasing the mechanical advantage of the force applied to said inner member when said operating lever and said main torque member are pivoted toward the engaged position.

8. Apparatus as defined in claim 7, wherein said mechanical advantage increasing means includes a nose portion projecting from said lever arm portion to a position over which the inner member is guided.

9. Apparatus as defined in claim 7, wherein said pulley is connected with said lever arm portion for rotation about an axis parallel with the axis of rotation of said main torque member, thereby to increase the mechanical advantage of the force applied to said inner member when said lever and said main torque tube are pivoted toward the engaged position.

* * * * *